(12) United States Patent
Goyal et al.

(10) Patent No.: US 7,590,093 B1
(45) Date of Patent: Sep. 15, 2009

(54) CONDITIONING REMOVAL OF AN OVERLAY CARRIER FREQUENCY FROM A CELLULAR WIRELESS COVERAGE SYSTEM

(75) Inventors: Anoop K. Goyal, Overland Park, KS (US); Manish Padte, Overland Park, KS (US); Hemanth B. Pawar, Herndon, VA (US); Shilpa Kowdley Srinivas, Herndon, VA (US); E. Michael Shafer, II, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 12/330,109

(22) Filed: Dec. 8, 2008

(51) Int. Cl.
*H04Q 7/20* (2006.01)

(52) U.S. Cl. .................. 370/331; 455/436; 455/442; 370/330; 370/335

(58) Field of Classification Search .......... 455/423, 455/436–444, 450, 524–525, 509; 370/330–335
See application file for complete search history.

(56) References Cited

U.S. PATENT DOCUMENTS

| | | | | |
|---|---|---|---|---|
| 5,649,292 A | * | 7/1997 | Doner | 455/447 |
| 5,987,326 A | * | 11/1999 | Tiedemann et al. | 455/442 |
| 6,424,834 B1 | * | 7/2002 | Chang et al. | 455/436 |
| 6,549,524 B1 | * | 4/2003 | Shin | 370/331 |
| 7,050,804 B1 | * | 5/2006 | Wurtenberger et al. | 455/436 |
| 7,313,398 B1 | * | 12/2007 | Ramahi | 455/436 |
| 2002/0061751 A1 | * | 5/2002 | Zhao | 455/442 |
| 2004/0102194 A1 | * | 5/2004 | Naghian et al. | 455/436 |
| 2005/0044130 A1 | * | 2/2005 | Sillasto et al. | 709/200 |
| 2007/0281698 A1 | * | 12/2007 | Lin | 455/436 |
| 2007/0281737 A1 | * | 12/2007 | Zhao | 455/552.1 |

* cited by examiner

*Primary Examiner*—Kamran Afshar

(57) ABSTRACT

Disclosed herein is a method to condition removal of a carrier frequency from a wireless coverage area. The method involves evaluating handoff statistics for the coverage area, and applying results of past carrier frequency removal (preferably from a morphologically similar cluster) to predict a net change in hard handoffs that will result if the carrier frequency is removed. The method then involves using the predicted net change in hard handoffs as a basis to determine whether to remove the carrier frequency. The predicted net change in hard handoffs may be converted to a corresponding predicted net change in call drops, and the carrier frequency may be removed only if the predicted net change in call drops does not exceed a threshold.

19 Claims, 4 Drawing Sheets

CONDITIONING REMOVAL OF AN OVERLAY CARRIER FREQUENCY FROM A CELLULAR WIRELESS COVERAGE SYSTEM

BACKGROUND

In a typical wireless communication system, an area is divided geographically into a number of cell sites that are each defined by one or more radio frequency (RF) radiation patterns from a respective base transceiver station (BTS) antenna. Most cell sites are usually further divided geographically into a number of sectors that are each defined respectively by radiation patterns from directional antenna elements of the respective BTS antenna. The radiation pattern of each cell or cell sector produces an air interface that defines a respective coverage area.

Cell sites of the typical wireless communication system are operated by one or more wireless service providers (WSP). A WSP is a company that provides telecommunications through RF signals rather than (or in addition to) through end-to-end wire communication. A WSP may transmit signals using one or more carrier frequencies. A carrier frequency (or simply "carrier") is a transmitted electromagnetic pulse at a steady frequency of alternation on which information can be imposed by increasing signal strength, varying the frequency, or other means.

Each cell site in a wireless communication system may support only a limited amount of wireless signal traffic, based at least in part on the number of carrier frequencies used by the cell site. Depending on where the cell site is located (e.g., in a rural area, or in an urban area), the WSP may choose to implement a greater or fewer number of carrier frequencies in the cell site, in order to support a commensurate, expected amount of traffic. As a result, various cell sites throughout the WSP's network may use different numbers of carrier frequencies.

In some wireless communication systems (such as those operating in accordance with the Code Division Multiple Access (CDMA) protocol, among others), numerous cell sites in a given market area will all use the same base carrier frequency, which can be referred to as F1. Depending on traffic requirements, certain ones of the cell sites may then additionally use a number of "overlay" carrier frequencies, such as F2, F3, and so forth. (The particular frequency (e.g., center frequency) of each of these carriers is not critical for this discussion.)

Furthermore, each carrier frequency used in a cell site may have an associated cost, in terms of power to drive communications on the carrier frequency, backhaul and other associated infrastructure to support communications on the carrier frequency, and perhaps a license to use the carrier frequency. Therefore, when a WSP adds an overlay carrier frequency to a cell site, the WSP may incur an incremental cost for doing so. It follows that a WSP may also be able to reduce costs by removing or "turning down" carrier frequencies that are not absolutely necessary to maintain an acceptable level of operation in the WSP's network.

Overview

Disclosed herein is a method for intelligently conditioning removal of a carrier frequency from a cell site in a wireless communication system. The method involves applying a set of process steps to predict an impact of removing the carrier frequency from the cell site, and based on the result of the prediction, deciding whether to remove the carrier frequency. If the prediction is that removing the carrier frequency would have a threshold detrimental impact on network performance, then the decision may be to not remove the carrier frequency. On the other hand, if the prediction is that removing the carrier frequency would not have such a detrimental impact on network performance, then the decision may be to remove the carrier frequency, thus potentially reducing the WSP's cost.

In accordance with the method, the prediction of impact will be based on the extent to which hard handoffs are likely to increase as a result of removing the carrier frequency.

A "hard handoff" is generally understood to occur when a mobile station being served by a wireless communication system transitions during a call (e.g., voice call or data session) from operating on one carrier frequency to operating on another carrier frequency. Most commonly, this can occur when a mobile station is operating on an overlay carrier frequency in one cell site and moves over to another cell site where that overlay carrier frequency is not in use. However, a hard handoff can occur in other scenarios as well, such as when a mobile station transitions between carrier frequencies for load balancing purposes or for other reasons. In any event, a hard handoff generally requires special network processing to allow the call to continue across the frequency transition. As a result of difficulties in such a transition, some hard handoffs will result in dropped calls, thereby adversely affecting user experience. Therefore, hard handoffs are generally undesirable, although often necessary.

Contrasted with hard handoffs are "soft handoffs," which occur when a mobile station that is engaged in a call transitions from operating in a wireless coverage area (e.g., cell site) on one carrier frequency to operating in another wireless coverage area on the same carrier frequency. With such a handoff, the mobile station's call needs to transition from one coverage area to another, but the call remains on the same carrier frequency. Maintaining the call on the same carrier frequency greatly reduces the chance of losing the call.

When an overlay carrier frequency is removed from a wireless coverage area, handoffs that would have been soft handoffs to that carrier frequency may instead become hard handoffs to some other carrier frequency in the coverage area. Likewise, hard handoffs from the carrier frequency in the coverage area might become soft handoffs from some other carrier frequency in the coverage area.

To predict the impact of removing the carrier frequency from the coverage area, the results of past carrier frequency removal will be evaluated to determine approximately what portion of soft handoffs would become hard handoffs, and to determine approximately what portion of hard handoffs would become soft handoffs. The conversion from soft handoffs to hard handoffs represents a delta increase in hard handoffs. And the conversion from hard handoffs to soft handoffs represents a delta decrease in hard handoffs. By offsetting the delta increase with the delta decrease, a net change in number of hard handoffs can then be predicted.

The predicted net change in number of hard handoffs can in turn be correlated to a prediction of net change in number of dropped calls and thus a resulting impact on user experience. In particular, network performance statistics may indicate the percentage of hard handoffs that tend to result in dropped calls. By applying that percentage to the predicted net change in number of hard handoffs, a prediction of net change in number of dropped calls may be computed.

In turn, the net change in number of hard handoffs (e.g., the correlated net change in number of dropped calls) may be used as a basis to decide whether to remove the carrier frequency at issue. If the net change would be greater than a threshold, then the decision may be to not remove the carrier frequency, as the assumption may be that removing the carrier frequency would have a threshold negative impact on user experience. Whereas, if the net change would not be greater than the threshold or would be less than a threshold, then the decision may be to remove the carrier frequency.

If the decision is to remove the carrier frequency, then the WSP may remove the carrier frequency. For instance, the WSP may remove from the WSP's infrastructure for the wireless coverage area some or all of the infrastructure (e.g., power amplifier, backhaul connections, antennas, etc.) or other resources associated with the carrier frequency. Alternatively or additionally, the WSP may restructure (e.g., reprogram or otherwise physically change) equipment serving the wireless coverage area to turn off transmissions on the carrier frequency and/or to otherwise substantially reduce such transmissions. Other mechanisms for removing the carrier frequency are possible as well, the details of which are not critical.

These as well as other aspects, advantages, and alternatives will become apparent to those of ordinary skill in the art by reading the following detailed description with reference where appropriate to the accompanying drawings.

DETAILED DESCRIPTION

Figure 1:
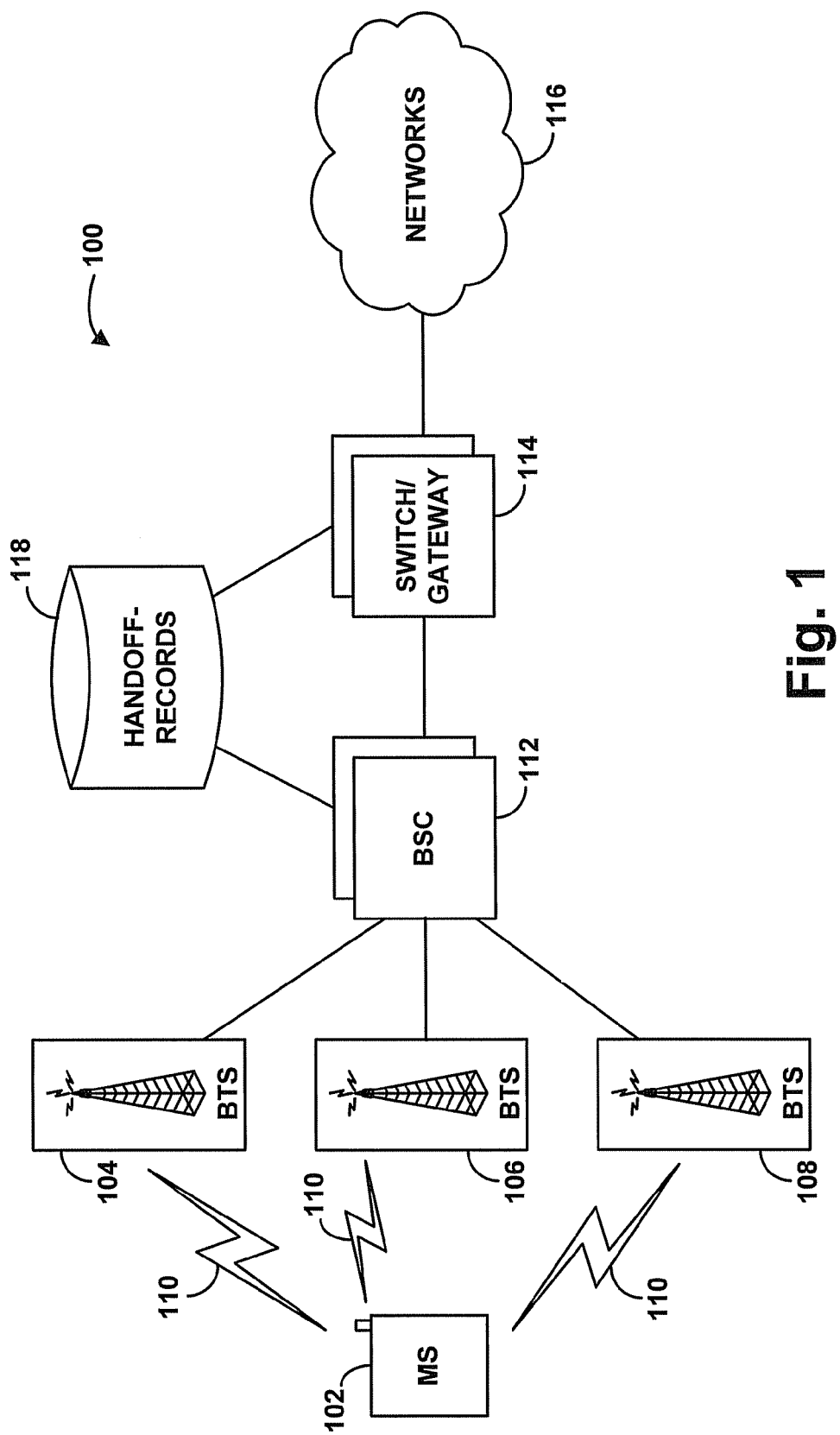
FIG. 1 is a simplified block diagram of a wireless communication system in or with respect to which the present method can be implemented.

Referring now to the figures, FIG. 1 is a block diagram illustrating one embodiment of a wireless communication system 100. It should be understood, however, that this and other arrangements and functions described herein (including in the above overview section) are set forth for purposes of example only, and other arrangements and functions can be used instead and some may be omitted altogether. Further, as in most telecommunications applications, those skilled in the art will appreciate that many of the elements described herein are functional entities that may be implemented with hardware, firmware and/or software, and as discrete components or in conjunction with other components, in any suitable combination and location. Still further, the names of various components are not intended to indicate association with just one type of system. Various systems may use analogous component under other names.

By way of example, the wireless communication system 100 is shown to include a representative mobile station (MS) 102, and three representative base transceiver stations (BTSs) 104, 106, 108, each of which radiates to define an air interface 110 providing coverage through which mobile stations such as mobile station 102 may communicate wirelessly with the BTS. As shown, the BTSs may be coupled with one or more base station controllers (BSCs) 112. And the BSC(s) may then be coupled with one or more switches and/or gateways 114, which provide connectivity with one or more transport networks 116. With this example arrangement, when mobile station 102 is positioned in the coverage of a given BTS and is served by the BTS, the mobile station may engage in communication with entities on network(s) 112 via a communication path comprising the air interface, the BTS, a BSC, a switch/gateway, and the network.

Generally, each BTS in the wireless communication system includes one or more antennas arranged to produce radiation patterns defining one or more sectors. The antennas may be any antenna desired and may, for example, comprise antenna arrays. Further, although not shown, each BTS would include various other equipment, such as one or more power amplifiers arranged to amplify communication traffic for transmission over the air from the BTS antennas.

Each BSC 110 generally functions to control one or more BTSs, such as to control handoffs of mobile stations between BTSs, and to manage other aspects of air interface operation. Each switch and/or gateway may in turn function to control one or more BSCs, such as to control handoffs of mobile stations between BSC serving areas for instance. An example switch is a mobile switching center (MSC), which typically provides connectivity with the public switched telephone network, so as to allow mobile stations to engage in telephone calls. An example gateway is a packet data serving node (PDSN), which is a network access server that provides connectivity with a packet-switched network such as the Internet or a service provider's core packet network for instance.

As additionally shown, each BSC, switch, and gateway may be coupled with a handoff-records database 118, such as an operation management platform (OMP), in which BSCs, switches, gateways, and/or other entities (e.g., BTSs) may store records of handoffs. The handoff records may include data specifying source and target coverage areas, source and target carrier frequencies, indications of success or failure, call drop data, and so forth. In practice, when an entity such as a BSC facilitates or allows a handoff, the entity may store a record of the handoff in the handoff-records database 118 for later reference by network administrators or for other purposes.

Each of the couplings of the wireless communication system 100, excluding the air interface 104, may be an interface such as a trunk level 1 (T1) line, an Ethernet line, a signaling link, or one or more other connections (whether wired or wireless). In general, a network will be designed with sufficient capacity in these links to support an expected amount of traffic.

In the wireless communication system 100, each BTS may engage in radio frequency (RF) communication with mobile stations using one or more carrier frequencies. Communications can be imposed onto the carrier frequencies using any form of modulation, such as amplitude modulation (AM), frequency modulation (FM), phase modulation, or others. Typically, a carrier frequency may be a pair of frequencies, one used for forward link communication from the BTS to the MS, and another used for reverse-link communication from the MS to the BTS. However, other arrangements are possible as well.

In operation, when the mobile station 102 is within a sector of a cell defined by a BTS, the mobile station 102 may wirelessly communicate with the BTS on one of the carrier frequencies. As the MS moves from that sector into another sector, the wireless communication may automatically switch the mobile station's point of contact with the system. For instance, if mobile station 102 moves from one sector of BTS 106 to another sector of BTS 106, the BTS or a BSC may orchestrate a handoff through which the system may begin communicating with the MS via the new sector and discontinue communication with the mobile station via the old sector. Likewise, if the mobile station moves from a sector of BTS 106 into a sector of BTS 108, a BSC may orchestrate a handoff through which the system begins communicating with the mobile station via the new sector of the new BTS and discontinues communicating with the mobile station via the old sector of the old BTS.

Generally, mobile station handoff between coverage areas (such as cells or cell sectors) can be triggered by numerous factors. Most commonly, for instance, handoff may triggered by a threshold change in signal strength or signal quality, as may happen when a mobile station physically moves from one coverage area to another, or when air interface conditions change in one coverage area or another and thereby impact signal quality. Further, as noted above, handoff may occur for load balancing purposes. Still other handoff triggers may be possible as well.

By way of example, if a mobile station is operating in a sector and receiving forward link communications with a particular strength or signal-to-noise ratio, the mobile station may begin receiving from another sector forward link communications that have threshold higher strength or signal-to-noise ratio. Upon detecting the better signal, the mobile station may then send a report signal in a reverse link control channel message to its serving BTS, which the BTS may pass along to the serving BSC. The BSC may then responsively send a handoff direction command as a forward link control channel message via the BTS to the mobile station. In response, the mobile station may then switch over to communicate with the system on the new sector and perhaps discontinue communication with the system on the old sector. In other systems, the mobile station may merely report the strongest/best sector to the system, and the system may responsively begin communicating with the MS via that sector.

As noted above, a mobile station may engage in "soft handoff" or "hard handoff" when moving between coverage areas of a wireless communication system.

In operation, if the mobile station is operating on a given carrier frequency in a wireless coverage area and switches over to operate on the same carrier frequency in another coverage area, then mobile station would engage in a soft handoff. Such a handoff could occur between BTSs, where two BTSs operate on the same carrier frequency, and where the mobile station moves from communicating via a sector of one BTS on the carrier frequency to communicating via a sector of another BTS on the same carrier frequency. Such a handoff could also occur between sectors of a given BTS, where the mobile station moves from communicating via one sector of the BTS on a given carrier frequency to communicating with another sector of the BTS on the same carrier frequency.

On the other hand, if mobile station 102 is operating on a given carrier frequency in a wireless coverage area and switches over to operate on a different carrier frequency, the mobile station would engage in a "hard handoff" as discussed above. Such a handoff could occur between two BTSs where the mobile station moves from communicating via a sector of one BTS on one carrier frequency to communicating via a sector of another BTS on a different carrier frequency. This may happen, for example, where the target sector does not operate on the carrier frequency that the mobile station was using in the source sector, such as where the mobile station was using an overlay frequency of the source sector but the target sector does not operate on that overlay frequency. Such a handoff could also occur between sectors of a given BTS or even within a given sector, where the BTS directs the mobile station to switch carrier frequencies for load balancing purposes or for other reasons.

Generally, soft handoff is more reliable than hard handoff. With soft handoff, as no change between carrier frequencies is necessary, a more seamless transition occurs, and the changes of maintaining the mobile station's call across the transition are fairly high. On the other hand, with hard handoff, a change in carrier frequencies occurs, which may be more likely to result in a temporary disconnection of the call and in turn perhaps a dropped call.

Figure 2:
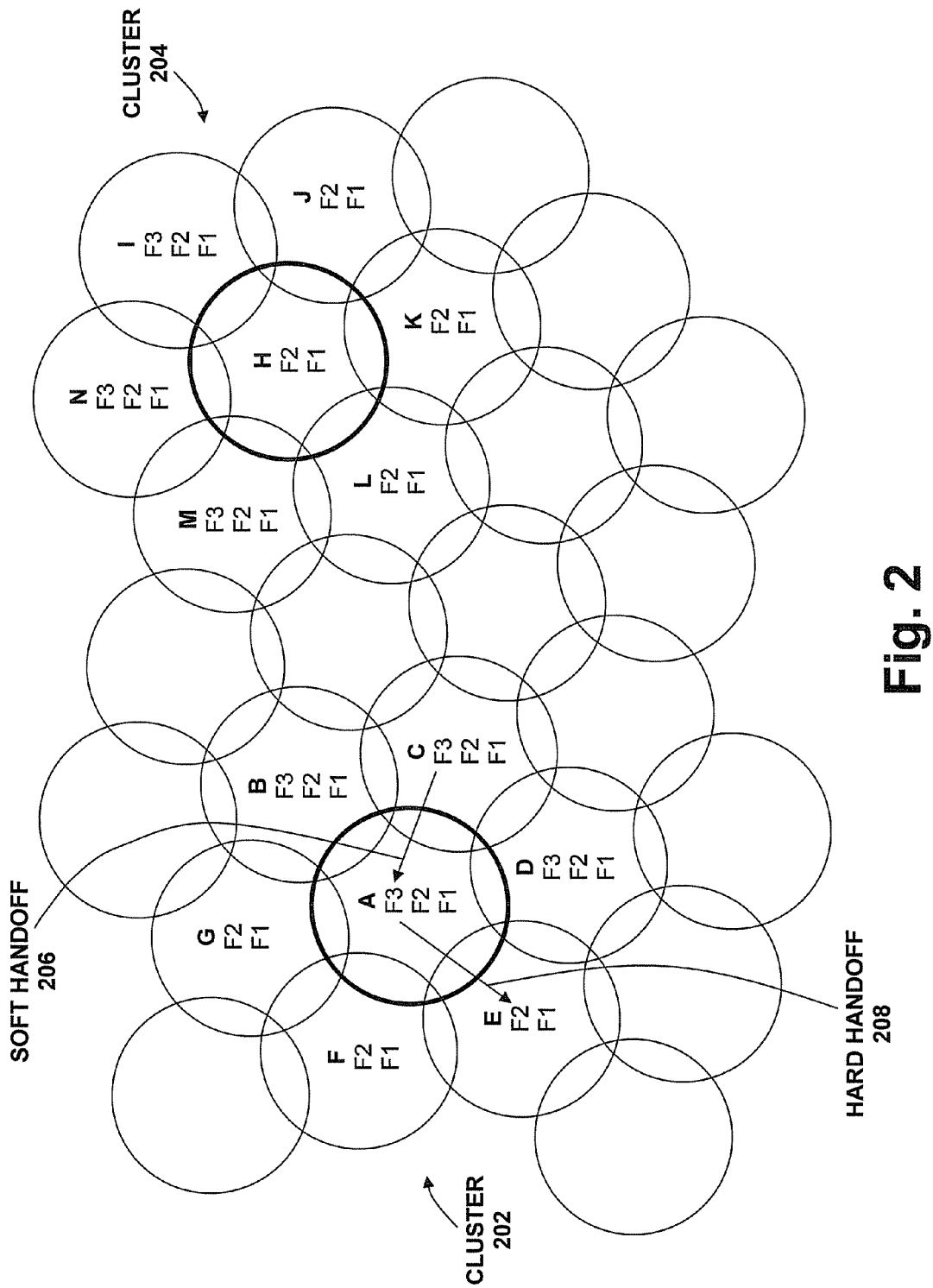
FIG. 2 is a conceptual illustration of a wireless service provider's market including numerous wireless coverage areas, which may be subject to the present method.

FIG. 2 is a conceptual illustration of a wireless service provider's market having multiple wireless coverage areas. In the illustration, the wireless coverage areas are depicted as circles all having a uniform size (scope of coverage) and overlapping each other to a uniform extent. In actual practice, however, the wireless coverage areas will likely vary in shape, size, and extent of overlap. Each wireless coverage area may be a sector defined by a BTS (not shown), in which case the point where three circles overlap may be the location of a BTS that radiates to define those coverage areas. Alternatively, some or all of the circles may represent entire cell sites.

In general, the prediction analysis and decision whether to remove a carrier frequency from a coverage area may be performed with respect to a cell site, taking into consideration cumulative handoff statistics of the cell sites various sectors. Alternatively, the analysis and decision may be performed with respect to just a particular sector of a cell site. The analysis and decision process will be discussed in detail below.

Certain representative coverage areas in FIG. 2 are labeled with reference letters A through N, to denote the coverage area. Further, each of those coverage area is labeled with "F" numbers that indicate carrier frequencies on which the coverage area operates, particularly base frequency F1, overlay frequency F2, and overlay frequency F3. For example, coverage area A is shown operating on frequencies F1, F2, and F3 (i.e., base frequency F1 and overlay frequencies F2 and F3), coverage area C is shown also operating on frequencies F1, F2, and F3, and coverage area E is shown operating on just frequencies F1 and F2. Although no coverage areas are shown operating on only frequency F1, that is a possibility. Likewise, a coverage area may operate on greater than three carrier frequencies, or perhaps other carrier frequencies.

Groups of coverage areas in a wireless communication system may be considered to define clusters of coverage areas. In practice, a cluster may be defined with respect to a given coverage area, to be that coverage area and all of its first tier (directly adjacent) neighboring coverage areas. Alternatively, a cluster may be defined to be a coverage area and all of its first tier and second tier neighboring coverage areas. Still alternatively, a cluster may be defined to encompass all coverage areas that exist in whole or in part within a specified distance from a center point of the given coverage area. Numerous other ways to define coverage area clusters are possible as well, and the details of the cluster definition are not critical.

In the arrangement shown in FIG. 2, for instance, two example clusters are the first tier cluster of coverage area A, labeled cluster 202, and the first tier cluster of coverage area H, labeled cluster 204. The first tier cluster of coverage area A is defined to consist of coverage areas A-G (namely, coverage area A and its first tier neighbors B-G). And the first tier cluster of coverage area K is defined as coverage areas H-N (namely, coverage area H and its first tier neighbors I-N).

Shown in FIG. 2 are arrows 206, 208 representing possible handoffs among coverage areas in the first tier cluster of coverage area A.

Arrow 202 represents an example soft handoff scenario, between coverage areas C and A. In particular, when a mobile station is operating on carrier frequency F3 in coverage area C and moves to coverage area A, the mobile station would typically continue its call on carrier frequency F3 in coverage area A, since coverage area A offers that overlay carrier frequency as well.

Arrow 204, on the other hand, represents an example of hard handoff between coverage areas A and E. In particular, when a mobile station is operating on carrier frequency F3 in coverage area A and moves into coverage area E, the mobile station would need to engage in a hard handoff, because coverage area E does not operate on carrier frequency E. In that case, the mobile station may hand down to carrier frequency F2 as shown or may hand down to base carrier frequency F1.

The present method addresses the question of whether to remove (or "turn down") a carrier frequency in a given wireless coverage area. The carrier frequency at issue may be selected for analysis based on various factors, such as an evaluation of traffic patterns, service-provider revenue, or the like. Alternatively, the analysis may be conducted generally for various carrier frequencies in various coverage areas of a service provider's market, in an effort to identify each carrier frequency that can or should be removed, to reduce the service provider's cost of operation.

The method may be applied manually and/or through computer processing to evaluate whether to remove the carrier frequency and, if so, to then physically remove the carrier frequency (e.g., by removing or reducing network infrastructure, turning down power output on the frequency, or making other changes).

For example, a network engineer may manually extract handoff statistics from handoff-records database 118 and to perform the analysis to determine whether to turn down a particular cell site's carrier frequency. To extract the handoff statistics, the engineer may operate a computer terminal having access (e.g., via a network) to the handoff-records database 118, and may query the handoff-records database 118 to obtain the desired data. The engineer may then perform the analysis base on that data, to reach a decision whether to remove the carrier frequency. If the decision is to remove the carrier frequency, then an engineer may make physical changes to the cell site's BTS and perhaps other aspects of the wireless communication system, to remove the carrier frequency. The changes may be made at least in part by adjusting or removing hardware, software, and/or other infrastructure associated with the cell site, possibly by operating a computer terminal through which control commands can be sent to adjust the infrastructure.

As another example, a computer processor may operate to automatically extract handoff statistics from the handoff-records database and to perform the analysis to determine whether to turn down a particular cell site's carrier frequency. The computer processor may be provided in a server coupled with the handoff-records database 118 and dedicated to performing this analysis. Alternatively, the processor may be part of another network entity. For instance, a BSC or MSC may include a processor programmed to extract the data from the handoff-records database, and to perform the analysis to determine whether to remove a particular carrier frequency. If the decision is to remove the carrier frequency, the computer may then provide (e.g., output and/or transmit) an alert for receipt by an engineer or one or more other computers, directing that the carrier be removed from the cell site. And the recipient engineer or other computer may then effect the physical removal of the carrier frequency. Alternatively, if the processor that performs the analysis has more direct access to the infrastructure (e.g., power amplifiers, software, etc.) that needs to be changed in order to remove the carrier frequency, the processor may more directly effect removal of the carrier frequency.

Figure 3:
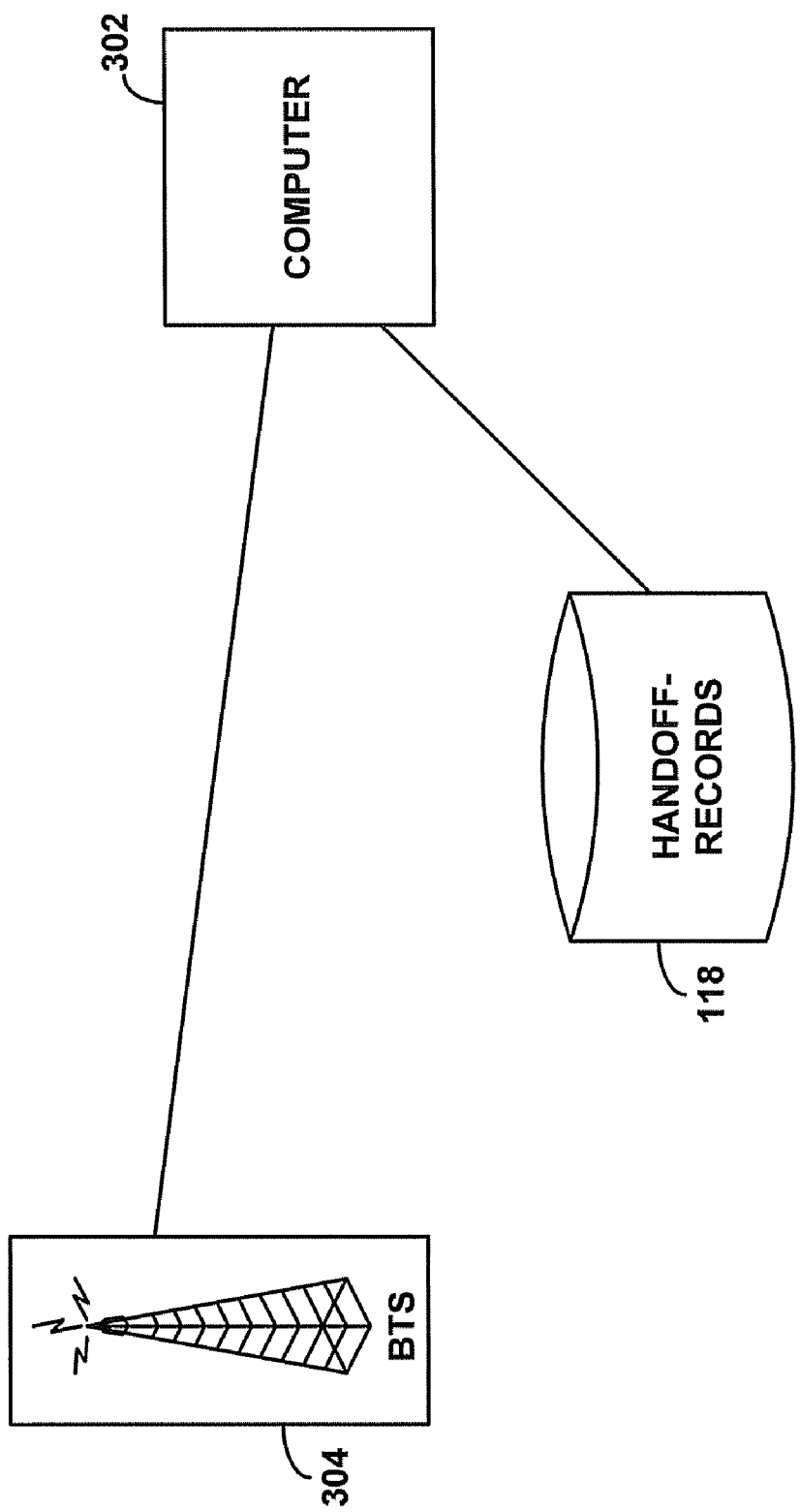
FIG. 3 is a simplified block diagram of an arrangement for implementing the method.

FIG. 3 is a simplified block diagram depicting an example arrangement for carrying out the analysis at least in part through machine implementation and perhaps for carrying out the removal of a carrier frequency. The figure depicts a computer 302 communicatively linked with handoff-records database 118 and further communicatively linked with a BTS 304. By way of example, the carrier frequency at issue may be carrier frequency F3 in coverage area A of FIG. 2, and so the BTS 304 would be a BTS that provides coverage area A. The computer may be a terminal operated by an engineer and/or a server arranged to automatically implement the analysis and perhaps the carrier frequency removal. Other arrangements are possible as well.

Figure 4:
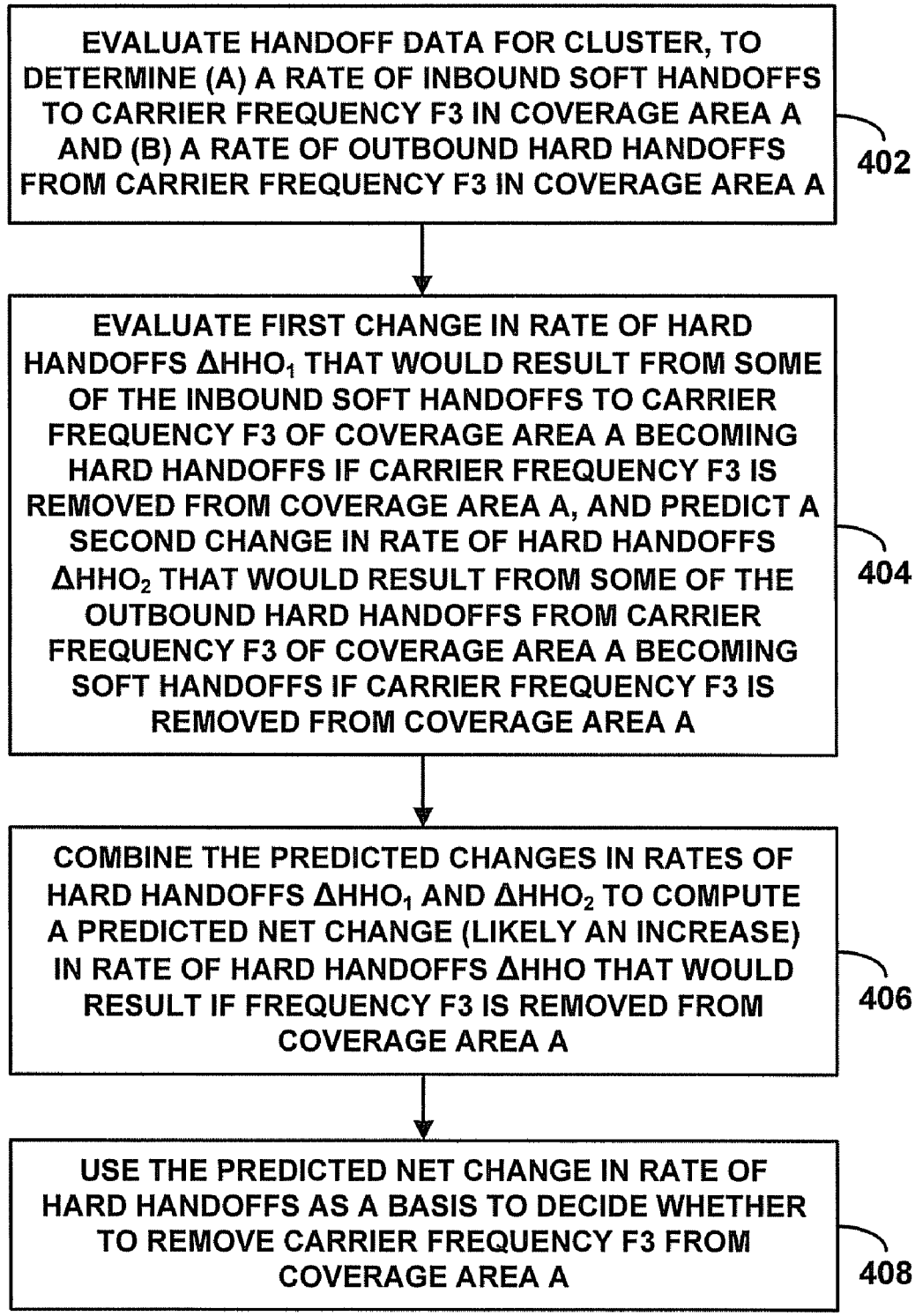
FIG. 4 is a flow chart depicting functions that can be carried out to implement the method.

FIG. 4 is next a flow chart depicting functions that can be carried out in accordance with the present method, to condition removal of overlay carrier frequency F3 from coverage area A. The method assumes that the coverage area at issue is in a cluster of coverage areas in which a plurality of coverage areas are adjacent to the coverage area at issue, with the cluster being defined in a desired manner, such as a first tier cluster for instance. As noted above, a first tier cluster defined with respect to coverage area A may consist of coverage areas A-G.

As shown in FIG. 4, a first step 402 of the method is evaluating handoff data for the cluster, to determine (a) a rate of inbound soft handoffs to carrier frequency F3 in coverage area A and (b) a rate of outbound hard handoffs from carrier frequency F3 in coverage area A. This step can be carried out by querying the handoff-records database 118 to determine a number of soft handoffs that occurred to carrier frequency F3 of coverage area A per unit time (e.g., as an average or as a bulk count over a period of time), and to determine a number of hard handoffs that occurred from carrier frequency F3 of coverage area A per unit time.

Inbound soft handoffs will be relevant to the analysis, since some of those handoffs may become hard handoffs to another carrier frequency of coverage area A if carrier frequency F3 is removed from coverage area A. Considering arrow 206 shown in FIG. 3, for instance, the inbound soft handoff from carrier frequency F3 of coverage area C to carrier frequency F3 of coverage area A may become an inbound hard handoff from carrier frequency F3 of coverage area C to carrier frequency F2 (or F1) of coverage area A, if carrier frequency F3 is removed from coverage area A.

Outbound hard handoffs will be relevant to the analysis, since some of those handoffs may become soft handoffs. Considering arrow 208 shown in FIG. 3, for instance, the outbound hard handoff from carrier frequency F3 of coverage area A to carrier frequency F2 of coverage area E may become an outbound soft handoff from carrier frequency F2 of coverage area A to carrier frequency F2 of coverage area E.

A next step 404 of the method is then to predict a first change in rate of hard handoffs $\Delta HHO_1$ that would result from some of the inbound soft handoffs to carrier frequency F3 of coverage area A becoming hard handoffs if carrier frequency F3 is removed from coverage area A, and to predict a second change in rate of hard handoffs $\Delta HHO_2$ that would result from some of the outbound hard handoffs from carrier frequency F3 of coverage area A becoming soft handoffs if carrier frequency F3 is removed from coverage area A.

These predictions of changes in hard handoff are made in accordance with observed results of past carrier frequency removal. In particular, the analysis involves evaluating what changes in rates of hard handoff have occurred in the past when a carrier frequency was removed from a coverage area. Preferably, the past carrier frequency removal would be with respect to the same coverage area and cluster or with respect to a coverage area and cluster that has a morphology (e.g. layout, frequency allocation, and perhaps type of user base (e.g., rural, urban, etc.)) similar to that of the coverage area and cluster at issue.

In exemplary operation, the past carrier frequency removal may be with respect to an analogous carrier frequency (e.g., the same level of overlay) in an analogous coverage area (e.g., with similar frequency allocation and perhaps similar user base) in an analogous cluster (e.g., having similar relative positions and scope of coverage for the various coverage areas of the cell site). To make the analysis more simple (though possibly not as accurate), the analogous coverage and carrier frequency may be selected based on a more general factor such as merely whether in a common type of area (e.g., rural or urban) or another factor. Overall, the more similar the past carrier frequency removal is in morphology to the carrier frequency removal at issue, the more accurate the prediction should be. Thus, optimally, the process should involve selecting at least an analogous coverage area and analogous cluster based on a comparison of morphology of the analogous coverage area and analogous cluster with the coverage area and cluster at issue. This selection can be done through manual or computer-implemented processing and analysis of morphology data maintained by the wireless service provider.

In the arrangement shown in FIG. 2, if network data shows that carrier frequency F3 was removed from coverage area H (thereby leaving just carrier frequencies F2 and F1 in that coverage area as shown), a reasonable determination based on morphology analysis may be that coverage area H and its first tier cluster are analogous to coverage area A and its first tier cluster. This is so, because coverage area H, like coverage area A, operated on carrier, and because the first tier neighbors of coverage area H have the same frequency allocations as the first tier neighbors of coverage area A. Thus, the past removal of carrier frequency F3 from coverage area H may be used as the relevant past carrier frequency removal for purposes of determining the likely impact of removing carrier frequency F3 from coverage area A.

To predict the first change in rate of hard handoffs $\Delta HHO_1$ that would result from some of the inbound soft handoffs to carrier frequency F3 of coverage area A becoming hard handoffs if carrier frequency F3 is removed from coverage area A, the method may involve extracting handoff statistics regarding the analogous carrier frequency in the analogous cluster and using those statistics as a basis to determine the extent to which the rate of hard handoffs increased in the analogous cluster for a given quantity of inbound soft handoffs to the analogous carrier frequency in the analogous coverage area, upon removal of carrier frequency F3 from the analogous coverage area.

In particular, the analysis may first involve considering handoff statistics for the analogous cluster (e.g., cluster 204) from before carrier frequency F3 was removed from the analogous coverage area (e.g., coverage area H). Based on that data for a given time period (e.g., a month's worth of data), the analysis may involve determining a total number of inbound soft handoffs $SHO_{before}$ to carrier frequency F3 of the analogous coverage area, i.e., the total number of soft handoffs that that occurred from adjacent coverage areas having carrier frequency F3 (namely, coverage areas I, M, and N) to coverage area H. Further, based on the same period of handoff data, the analysis may involve identifying the total number of hard handoffs $HHO_{before}$ from each adjacent coverage area having carrier frequency F3 to any coverage area of the cluster. (This analysis is relevant, because, when carrier frequency F3 is removed, a soft handoff to carrier frequency F3 of coverage area A may not just change to a hard handoff to some other carrier frequency of coverage area A, but may change to a hard handoff to a different coverage area of the cluster.)

Further, the analysis may involve considering handoff statistics for the analogous cluster from after carrier frequency F3 was removed from the analogous coverage area. Based on that data for a given time period (e.g., a month's worth of data), the analysis may involve determining a total number of outbound hard handoffs $HHO_{after}$ from carrier frequency F3 of coverage areas adjacent to the analogous coverage area (e.g., coverage area H). In turn, the analysis may involve computing a change in number of hard handoffs $\Delta HHO$ (from carrier frequency F3 of the coverage areas adjacent to the analogous coverage area) as the difference between $HHO_{before}$ and $HHO_{after}$.

Still further, the analysis may involve establishing a ratio of the computed change in rate of hard handoffs $\Delta HHO$ to the rate of soft handoffs $SHO_{before}$ that existed before carrier frequency F3 was removed from the analogous coverage area. The ratio would thus be $\Delta HHO/SHO_{before}$. This ratio represents a prediction of the extent to which the rate of hard handoffs will change for a given rate of inbound soft handoffs that existed before the analogous carrier frequency was removed.

The analysis may then involve applying that ratio to the observed rate of inbound soft handoffs to carrier frequency F3 of coverage area A, i.e., the carrier frequency and coverage area at issue. To do so, the analysis may involve referring to the handoff statistics for coverage area A to determine, for a given period of time, a total count of inbound soft handoffs to carrier frequency F3 of coverage area A. In turn, the method may involve applying the ratio $\Delta HHO/SHO_{before}$ to that count so as to compute a predicted change in rate of hard handoffs $\Delta HHO_1$ that would result from some of the inbound soft handoffs to carrier frequency F3 of coverage area A becoming hard handoffs if carrier frequency F3 is removed from coverage area A.

To predict the second change in rate of hard handoffs $\Delta HHO_2$ that would result from some of the outbound hard handoffs from carrier frequency F3 of coverage area A becoming soft handoffs if carrier frequency F3 is removed from coverage area A, the method may involve extracting handoff statistics regarding the analogous carrier frequency in the analogous cluster and using those statistics as a basis to determine the extent to which the rate of outbound soft handoffs from the analogous coverage area (e.g., coverage area H) decreased for a given quantity of outbound hard handoffs from carrier frequency F3 of the analogous coverage area, upon removal of carrier frequency F3 from the analogous coverage area.

In particular, the analysis may first involve considering handoff statistics for the analogous cluster (e.g., cluster 204) from before carrier frequency F3 was removed from the analogous coverage area (e.g., coverage area H). Based on that data for a given time period (e.g., a month's worth of data), the analysis may involve determining a total number of outbound soft handoffs $HHO_{before}$ from carrier frequency F3 of the analogous coverage area, i.e., the total number of hard handoffs that that occurred from carrier frequency F3 of the analogous coverage area to the adjacent coverage areas. Further, based on the same period of handoff data, the analysis may involve determining the total number of soft handoffs $SHO_{before}$ that occurred (on any carrier frequency) from the analogous coverage area to the adjacent coverage areas. (This analysis of outbound soft handoffs from any carrier frequencies is relevant, since a mobile station that would have been served by carrier frequency F3 of coverage area A may instead be served by carrier frequency F1 or F2 of coverage area A upon removal of carrier frequency F3.)

Further, the analysis may involve considering handoff statistics for the analogous cluster from after carrier frequency F3 was removed from the analogous coverage area. Based on that data for a given time period (e.g., a month's worth of data), the analysis may involve determining a total number of outbound soft handoffs $SHO_{after}$ from the analogous coverage area to adjacent coverage areas. In turn, the analysis may involve computing a change in number of outbound soft handoffs $\Delta SHO$ (from the analogous coverage area) as the difference between $SHO_{before}$ and $SHO_{after}$.

Still further, the analysis may involve establishing a ratio of the computed change in rate of soft handoffs $\Delta SHO$ to the rate of hard handoffs $HHO_{before}$ that existed before carrier frequency F3 was removed from the analogous coverage area. The ratio would thus be $\Delta SHO/HHO_{before}$. This ratio represents a prediction of the extent to which the rate of outbound soft handoffs will change for a given rate of outbound hard handoffs that existed before the analogous carrier frequency was removed.

The analysis may then involve applying that ratio to the observed rate of outbound hard handoffs from carrier frequency F3 of coverage area A, i.e., the carrier frequency and coverage area at issue. To do so, the analysis may involve referring to the handoff statistics for coverage area A to determine, for a given period of time, a total count of outbound soft handoffs from carrier frequency F3 of coverage area A. In turn, the method may involve applying the ratio $\Delta SHO/HHO_{before}$ to that count so as to compute a predicted change in rate of soft handoffs $\Delta SHO$ that would result from some of the outbound hard handoffs from carrier frequency F3 of coverage area A becoming soft handoffs if carrier frequency F3 is removed from coverage area A. As a change in rate of soft handoffs would in theory correspond to a negative change in rate of hard handoffs, the analysis may then involve negating the predicted change in rate of soft handoffs $\Delta SHO$ so as to establish a predicted change in rate of hard handoffs $\Delta HHO_2$ that would result from some of the outbound hard handoffs from carrier frequency F3 of coverage area A becoming soft handoffs if carrier frequency F3 is removed from coverage area A.

Continuing with reference to FIG. 4, at step 406, the method then involves combining the predicted changes in rates of hard handoffs $\Delta HHO_1$ and $\Delta HHO_2$ to compute a predicted net change (likely an increase) in rate of hard handoffs $\Delta HHO$ that would result if frequency F3 is removed from coverage area A. The combining of the two deltas may simply involve adding them together. One will likely be positive and the other will likely be negative, so result may be taking the difference between the absolute values.

In turn, at step 408, the method involves using the predicted net change in rate of hard handoffs as a basis to decide whether to remove carrier frequency F3 from coverage area A. In particular, this step may involve conditioning the removal of the carrier frequency on a determination that the predicted net change in rate of hard handoffs is less than a threshold. If the predicted net change in rate of hard handoffs is not less than a threshold (i.e., there will be a relatively large increase in hard handoffs), then it would be reasonable to not remove the carrier frequency, so as to avoid a commensurate large increase in dropped calls. On the other hand, if the predicted net change in rate of hard handoffs is less than the threshold (i.e., there will be a relatively small increase in hard handoffs), then it would be reasonable to remove the carrier frequency, to help reduce service provider costs.

The act of using the predicted net change in rate of hard handoffs as a basis to decide whether to remove carrier frequency F3 from coverage area A may involve correlating the predicted net change in rate of hard handoffs to a predicted net change in call drops. The assumption here is that statistics provide some general measure of the extent to which hard handoffs tend to result in dropped calls. (For instance, say 5% of hard handoffs result in dropped calls.) Thus, this step may involve applying that general measure to the predicted net change in rate of hard handoffs to determine a predicted net change in call drops that would occur if carrier frequency F3 is removed from coverage area A. If the predicted net change in call drops exceeds a threshold, then it would be reasonable to not remove the carrier frequency, so as to not substantially impact user experience. On the other hand, if the predicted net change in call drops does not exceed the threshold, then it would be reasonable to remove the carrier frequency, to help reduce service provider costs.

Ultimately, in the example discussed above, if the predicted net increase in hard handoffs or the commensurate predicted net increase in call drops would not be too great, the method may thus involve removing carrier frequency F3 from coverage area A. In this case, since coverage area A has two other carrier frequencies, coverage area would then proceed to serve mobile stations on the other two frequencies and no longer serve mobile stations on carrier frequency F3. Of course, a determination may subsequently be made to add carrier frequency F3 back to the coverage area as well, possibly based on a similar type of analysis.

As noted above, the above analysis may be conducted with respect to a sector or a cell site. (For that matter, it could be applied with respect to a cluster as a whole, or with respect to some other defined wireless coverage area.) As a cell site typically defines multiple sectors, and as handoffs typically occur between sectors (whether intra-site or inter-site), the analysis may consider the cumulative handoff statistics for all sectors in the cell site at issue, as a way to define changes in rate of handoffs and otherwise to implement the above process.

An exemplary embodiment has been described above. Those of ordinary skill in the art will appreciate that changes and modifications to the embodiment described can be made while remaining within the scope of the invention.

We claim:

1. In a cluster of wireless coverage areas in which a given wireless coverage area operates on a plurality of carrier frequencies including at least a given overlay carrier frequency F, and in which a plurality of wireless coverage areas are adjacent to the given wireless coverage area, a method of conditioning removal of frequency F from the given wireless coverage area, the method comprising:

based on collected handoff data for the given cluster, determining (a) a rate of inbound soft handoffs SHO to frequency F of the given wireless coverage area and (b) a rate of outbound hard handoffs HHO from frequency F of the given wireless coverage area;

in accordance with observed results of past carrier frequency removal, (i) predicting a first change in rate of hard handoffs $\Delta HHO_1$ that would result from some of the inbound soft handoffs to frequency F of the given wireless coverage area becoming hard handoffs if frequency F is removed from the given wireless coverage area, and (ii) predicting a second change in rate of hard handoffs $\Delta HHO_2$ that would result from some of the outbound hard handoffs from frequency F of the given wireless coverage area becoming soft handoffs if frequency F is removed from the given wireless coverage area;

combining the predicted changes in rates of hard handoffs $\Delta HHO_1$ and $\Delta HHO_2$ to compute a predicted net increase in rate of hard handoffs $\Delta HHO$ that would result if frequency F is removed from the given wireless coverage area; and removing frequency F from the given wireless coverage area only if the predicted net increase in rate of hard handoffs is less than a threshold.

2. The method of claim 1, wherein the results of past carrier frequency removal are results of past removal of an analogous carrier frequency from an analogous wireless coverage area of an analogous cluster.

3. The method of claim 2, further comprising selecting the analogous wireless coverage area and analogous cluster based on comparison of morphology of the analogous wireless coverage area and analogous cluster with the given wireless coverage area and given cluster.

4. The method of claim 1, wherein removing frequency F from the given wireless coverage area only if the predicted net increase in rate of hard handoffs $\Delta HHO$ is less than a threshold comprises:

making a determination of whether the predicted net increase in rate of hard handoffs $\Delta HHO$ is less than the threshold;

if the determination is that the predicted net increase in rate of hard handoffs $\Delta HHO$ is not less than the threshold, then not removing frequency F from the given wireless coverage area; and if the determination is that the predicted net increase in rate of hard handoffs $\Delta HHO$ is less than the threshold, then removing frequency F from the given wireless coverage area.

5. The method of claim 1, wherein removing frequency F from the given wireless coverage area only if the predicted net increase in rate of hard handoff is less than a threshold comprises:

applying past call-drop data to compute a predicted net increase in rate of call drops corresponding with the predicted net increase in rate of hard handoffs; and removing frequency F from the given wireless coverage area only if the predicted net increase in rate of call drops is less than a call drop threshold.

6. The method of claim 5, wherein removing frequency F from the given wireless coverage area only if the predicted net increate in rate of call drops is less than a call drop threshold comprises:

making a determination of whether the predicted net increase in rate of call drops is less than the call drop threshold;

if the determination is that the predicted net increase in rate of call drops is not less than the call drop threshold, then not removing frequency F from the given wireless coverage area; and if the determination is that the predicted net increase in rate of call drops is less than the call drop threshold, then removing frequency F from the given wireless coverage area.

7. The method of claim 1, wherein the given wireless coverage area serves mobile stations on the plurality of carrier frequencies including frequency F, and wherein removing frequency F from the given wireless coverage area comprises arranging the given cell to serve mobile stations on one or more carrier frequencies not including frequency F.

8. The method of claim 1, further comprising operating a computer processor to implement the method through at least the computing of the predicted net increase in rate of hard handoffs.

9. The method of claim 1, wherein in accordance with observed results of past carrier frequency removal predicting a first change in rate of hard handoffs $\Delta HHO_1$ that would result from some of the inbound soft handoffs to frequency F of the given wireless coverage area becoming hard handoffs if frequency F is removed from the given wireless coverage area comprises:

for an analogous carrier frequency R in analogous wireless coverage area in an analogous cluster, determining a ratio of (i) change in rate of hard handoffs from frequency R of wireless coverage areas adjacent the analogous wireless coverage area, where the change in rate of hard handoffs is determined by comparing rate of hard handoffs from frequency R of wireless coverage areas adjacent the analogous wireless coverage area before and after frequency R is removed from the analogous wireless coverage area, to (ii) rate of soft handoffs to frequency R in the analogous wireless coverage area before frequency R is removed from the analogous wireless coverage area; and applying the ratio to the determined rate of inbound soft handoffs SHO to frequency F of the given wireless coverage area, to determine the predicted first change in rate of hard handoffs $\Delta HHO_1$.

10. The method of claim 1, wherein in accordance with observed results of past carrier frequency removal predicting a second change in rate of hard handoffs $\Delta HHO_2$ that would result from some of the outbound hard handoffs from frequency F of the given wireless coverage area becoming soft handoffs if frequency F is removed from the given wireless coverage area comprises:

for an analogous carrier frequency R in analogous wireless coverage area in an analogous cluster, determining a ratio of (i) change in rate of soft handoffs from the analogous wireless coverage area, where the change in rate of soft handoffs from the analogous wireless coverage area is determined by comparing rate of soft handoffs from the analogous wireless coverage area before and after frequency R is removed from the analogous wireless coverage area, to (ii) rate of hard handoffs from frequency R of the analogous wireless coverage area before frequency R is removed from the analogous wireless coverage area;

applying the ratio to the determined rate of outbound hard handoffs HHO from frequency R of the given wireless coverage area, to determine a predicted change in rate of soft handoffs that would result from removing frequency F from the given wireless coverage area; and negating the predicted change in rate of soft handoffs to establish the predicted second change in rate of hard handoffs $\Delta HHO_2$.

11. The method of claim 1, further comprising:

a radio access network storing the collected handoff data in an operation management platform (OMP), the method further comprising retrieving the collected handoff data from the OMP to facilitate determining the rate of inbound soft handoffs SHO to frequency F of the given wireless coverage area and the rate of outbound hard handoffs HHO from frequency F of the given wireless coverage area.

12. In a cluster of wireless coverage areas in which a given wireless coverage area operates on a plurality of carrier frequencies including at least a given overlay carrier frequency F, and in which a plurality of wireless coverage areas are adjacent to the given wireless coverage area, a method of conditioning removal of frequency F from the given wireless coverage area, the method comprising:

evaluating past results of removing an analogous carrier frequency R from an analogous wireless coverage area in an analogous cluster, to determine (i) before frequency R was removed from the analogous wireless coverage area, a rate of soft handoffs $SHO_A$ to frequency R of the analogous wireless coverage area, and (ii) a change in rate of hard handoffs $\Delta HHO_A$ from frequency R of wireless coverage areas adjacent the analogous wireless coverage area, wherein $\Delta HHO_A$ is determined by comparing rate of hard handoffs from frequency R of wireless coverage areas adjacent the analogous wireless coverage area before and after frequency R is removed from the analogous wireless coverage area;

evaluating past results of removing the analogous carrier frequency R from the analogous wireless coverage area in the analogous cluster, to determine (i) before frequency R was removed form the analogous wireless coverage area, a rate of hard handoffs $HHO_A$ from frequency R of the analogous wireless coverage area, and (ii) a change in rate of soft handoffs $\Delta SHO_A$ from the analogous wireless coverage area, wherein $\Delta SHO_A$ is determined by comparing rate of soft handoffs from the analogous wireless coverage area before and after frequency R is removed from the analogous wireless coverage area;

determining a rate of soft handoffs $SHO_G$ to frequency F of the given wireless coverage area, and applying a ratio of $\Delta HHO_A/SHO_A$ to $SHO_G$ to predict a first change in rate of hard handoffs $\Delta HHO_G$ that will result from removing frequency F from the given wireless coverage area;

determining a rate of hard handoffs $HHO_G$ from frequency F of the given wireless coverage area, applying a ratio of $\Delta SHO_A/HHO_A$ to $HHO_G$ to predict a change in rate of soft handoffs $\Delta SHO_G$ that will result from removing frequency F from the given wireless coverage area, and negating the predicted change in rate of soft handoffs $\Delta SHO_G$ to establish a second predicted change in rate of hard handoffs $\Delta HHO_G$ that will result from removing frequency F from the given wireless coverage area;

combining the first predicted change in rate of hard handoffs $\Delta HHO_G$ with the second predicted change in rate of hard handoffs $\Delta HHO_G$ to establish a predicted net increase in rate of hard handoffs $\Delta HHO$ that will result from removing frequency F from the given wireless coverage area; and removing frequency F from the given wireless coverage area only if the predicted net increase in rate of hard handoffs $\Delta HHO$ is less than a threshold.

13. The method of claim 12, wherein removing frequency F from the given wireless coverage area only if the predicted net increase in rate of hard handoffs $\Delta HHO$ is less than a threshold comprises:

making a determination of whether the predicted net increase in rate of hard handoffs $\Delta HHO$ is less than the threshold;

if the determination is that the predicted net increase in rate of hard handoffs $\Delta HHO$ is not less than the threshold, then not removing frequency F from the given wireless coverage area; and if the determination is that the predicted net increase in rate of hard handoffs $\Delta HHO$ is less than the threshold, then removing frequency F from the given wireless coverage area.

14. The method of claim 12, wherein removing frequency F from the given wireless coverage area only if the predicted net increase in rate of hard handoff is less than a threshold comprises:

applying past call-drop data to compute a predicted net increase in rate of call drops corresponding with the predicted net increase in rate of hard handoffs; and removing frequency F from the given wireless coverage area only if the predicted net increase in rate of call drops is less than a call drop threshold.

15. The method of claim 14, wherein removing frequency F from the given wireless coverage area only if the predicted net increate in rate of call drops is less than a call drop threshold comprises:

making a determination of whether the predicted net increase in rate of call drops is less than the call drop threshold;

if the determination is that the predicted net increase in rate of call drops is not less than the call drop threshold, then not removing frequency F from the given wireless coverage area; and if the determination is that the predicted net increase in rate of call drops is less than the call drop threshold, then removing frequency F from the given wireless coverage area.

16. The method of claim 12, wherein the given wireless coverage area serves mobile stations on the plurality of carrier frequencies including frequency F, and wherein removing frequency F from the given wireless coverage area comprises arranging the given cell to serve mobile stations on one or more carrier frequencies not including frequency F.

17. The method of claim 12, further comprising operating a computer processor to implement the method.

18. The method of claim 12, further comprising retrieving handoff statistics for the given cluster and for the analogous cluster, so as to facilitate the method.

19. The method of claim 18, wherein the handoff statistics are stored in an operation management platform (OMP), and where retrieving the handoff statistics comprises retrieving the handoff statistics from the OMP.

* * * * *

UNITED STATES PATENT AND TRADEMARK OFFICE
CERTIFICATE OF CORRECTION

PATENT NO. : 7,590,093 B1  
APPLICATION NO. : 12/330109  
DATED : September 15, 2009  
INVENTOR(S) : Goyal et al.

Page 1 of 1

It is certified that error appears in the above-identified patent and that said Letters Patent is hereby corrected as shown below:

Column 13, Line 48, "increate" should read --increase--

Column 16, Line 26, "increate" should read --increase--

Signed and Sealed this  
Eleventh Day of January, 2011

David J. Kappos  
*Director of the United States Patent and Trademark Office*